(12) United States Patent
TerBeek

(10) Patent No.: US 8,205,742 B2
(45) Date of Patent: Jun. 26, 2012

(54) HARVESTER BUCKET

(75) Inventor: Michael TerBeek, Lynden, WA (US)

(73) Assignee: Oxbo International Corporation, Byron, NY (US)

(*) Notice: Subject to any disclaimer, the term of this patent is extended or adjusted under 35 U.S.C. 154(b) by 72 days.

(21) Appl. No.: 12/533,571

(22) Filed: Jul. 31, 2009

(65) Prior Publication Data

US 2010/0139233 A1  Jun. 10, 2010

Related U.S. Application Data

(60) Provisional application No. 61/085,739, filed on Aug. 1, 2008.

(51) Int. Cl.
*B65G 17/36* (2006.01)

(52) U.S. Cl. .......................... 198/712; 198/707; 198/711

(58) Field of Classification Search .................. 56/328.1, 56/330; 198/706, 701, 713, 712, 708, 704, 198/714, 707, 711; 37/444; D15/32, 28; D34/24, 35, 29
See application file for complete search history.

(56) References Cited

U.S. PATENT DOCUMENTS

| | | | |
|---|---|---|---|
| D3,745 S | 11/1869 | Storms et al. | |
| D15,570 S | 11/1884 | Woehrle | |
| 437,506 A * | 9/1890 | Otten | 198/707 |
| 667,192 A * | 2/1901 | Craig | 198/707 |
| 714,149 A | 11/1902 | Clarke | |
| 1,830,603 A | 11/1931 | Gumper | |
| 2,339,938 A | 1/1944 | Meyer | |
| 3,083,814 A | 4/1963 | Meyer | |
| 3,112,822 A * | 12/1963 | Meyfarth, Jr. | 198/706 |
| 3,144,123 A | 8/1964 | Wiese | |
| D225,128 S | 11/1972 | Gregor | |
| D227,156 S | 6/1973 | Callies | |
| 3,756,002 A | 9/1973 | Mecca | |
| 3,777,463 A | 12/1973 | Claxton | |
| 3,795,305 A | 3/1974 | Sandvik | |
| 3,988,878 A | 11/1976 | Mecca | |
| 4,019,625 A | 4/1977 | Wiese | |
| 4,184,585 A * | 1/1980 | Harvey | 198/707 |
| 4,246,999 A * | 1/1981 | Bryant et al. | 198/713 |
| 4,548,314 A | 10/1985 | Marsh | |
| D286,929 S | 11/1986 | Brandon | |
| D293,037 S | 12/1987 | Capawana | |
| 4,770,287 A | 9/1988 | Glowatzki | |
| 4,890,722 A * | 1/1990 | Gough | 198/706 |
| 4,944,387 A | 7/1990 | Burke | |
| 4,958,721 A | 9/1990 | Redford | |
| D312,261 S | 11/1990 | Burke | |
| 4,988,250 A | 1/1991 | Yamanaka | |
| 5,143,203 A | 9/1992 | Hinner | |
| D336,091 S | 6/1993 | Kovalak et al. | |

(Continued)

*Primary Examiner* — Arpad Fabian-Kovacs
(74) *Attorney, Agent, or Firm* — Merchant & Gould

(57) ABSTRACT

A harvester includes a conveyor having molded conveyor buckets. The conveyor includes a continuous first chain and a continuous second chain extending parallel to the first chain. Parallel spaced apart rods extend between the chains. Each bucket includes a front wall, a rear wall higher than the front wall, opposed sides connecting the front wall and the rear wall and a bottom portion connecting the front wall, the rear wall and the opposed sides. The front wall includes a mounting portion configured to extend over a rear wall of an adjacent bucket and one of the rods when assembled in a conveyor. The mounting portion is a lip in a first embodiment, an insert in a second embodiment and an upper portion of the front wall folded over in a third embodiment.

1 Claim, 24 Drawing Sheets

U.S. PATENT DOCUMENTS

| | | | |
|---|---|---|---|
| D338,893 S | 8/1993 | Simpson | |
| 5,526,922 A | 6/1996 | Clark | |
| 5,641,057 A * | 6/1997 | Chorlton | 198/708 |
| 5,660,266 A * | 8/1997 | Nolte | 198/711 |
| D389,976 S | 1/1998 | Burgess et al. | |
| D407,174 S | 3/1999 | Baker | |
| 6,237,745 B1 | 5/2001 | Kitamura | |
| 6,267,226 B1 | 7/2001 | Jarmain | |
| 6,334,527 B1 | 1/2002 | Kitamura | |
| 6,695,127 B1 * | 2/2004 | Dobranski | 198/711 |
| D496,052 S | 9/2004 | Braime et al. | |
| 6,945,386 B2 * | 9/2005 | Bierschenk et al. | 198/713 |
| D524,826 S | 7/2006 | Boyapally et al. | |
| 7,080,730 B2 * | 7/2006 | Ours et al. | 198/861.1 |
| D601,174 S * | 9/2009 | TerBeek | D15/28 |
| 2001/0050210 A1 | 12/2001 | Kitamura | |
| 2004/0026215 A1 | 2/2004 | Snowball | |
| 2010/0230244 A1 * | 9/2010 | Allard et al. | 198/706 |

* cited by examiner

HARVESTER BUCKET

BACKGROUND OF THE INVENTION

1. Field of the Invention

The present invention is directed to a conveyor system for a harvester having molded flexible buckets that mount on chains for fruit harvesters.

2. Description of the Prior Art

Fruit harvesters and in particular, berry harvesters, are used to mechanically harvest berries from plants, such as blueberries or raspberries, and collect and transport the berries from the field. Such harvesters typically include one or more conveyors that may include buckets that collect the berries loosened from the berry plants and dumps the fruit for cleaning and transport to storage and ultimately to other vehicles for transport from the field. A conventional over the row harvester is shown in FIGS. 4 and 5.

Endless conveyor run lifts, dumps and resets the buckets, which are typically mounted on endless chains of each side of the bucket. The cups or buckets are typically configured to overlap with adjacent buckets on the conveyor so that berries are not spilled between the buckets. The cups have been formed from a continuous belt, as shown in FIGS. 1-3. The belt, typically a PVC belt, is molded into a bucket or cup form and riveted to hold the bucket at an open orientation to receive berries and attach to rods mounted on continuous chains to the opposed edges of the belt. Although the formed cups operate in a satisfactory manner with little spillage, the assembly process is very labor intensive as the belt must be folded and several rivets are required for each individual cup. Rods or bars are typically mounted to connect to the two continuous chains for attachment of the buckets. The conveyors take the fruit from a lower portion of the machine where fruit is collected after falling from the plant and raised to the top of the machine where the fruit is dumped onto another conveyor belt where it can be cleaned, inspected and loaded into containers for further transport. In addition to being labor intensive, the continuous belt must be precut and is relatively expensive. It is also important that the belt material is sufficiently flexible to provide for mounting and flexing with the chain as it passes over idlers and sprockets. However, such required characteristics may adversely affect the useful life of the conveyor buckets and belt. Moreover, should there be a tear or one of the cups must be repaired, replacement may require cutting away a section of the belt and then splicing in a new section. Repair is relatively difficult and increases down time, thereby decreasing performance.

It can be seen then that a new and improved bucket and conveyor system is needed. Such a system should provide for buckets that overlap and minimize berries being spilled between the buckets. Moreover, such buckets should provide for easy, inexpensive and quick assembly. Such a system should allow for buckets that have a long life and are durable. The buckets should also provide for hanging at a proper angle and easy tipping and aligning. Moreover, should the system become damaged, the individual buckets should be easily replaceable with a further single bucket. The present invention addresses these problems, as well as others, associated with harvester bucket conveyor systems.

SUMMARY OF THE INVENTION

The present invention is directed to a molded bucket for a conveyor system and to a conveyor system used with over the row harvesters such as berry harvesters. The conveyor system and the buckets may be utilized with other configurations wherein a continuous bucket run is needed.

Over the row harvesters generally include a chassis and extend over and above rows of plants such as berry plants for example. Beater bars or other harvesting devices generally extend inward from the sides of the chassis along a tunnel formed in the chassis to engage the plants and remove the berries.

Over the row berry harvesters generally include at least two conveyors that have a lower run that collects fruit loosened by the harvester assembly and lift it upward for inspection, cleaning and temporary storage or further transfer to a larger container. The conveyor system of the present invention includes a lower run, a vertical lift portion and an upper dump run. The buckets are generally filled along the lower run and are then raised upward and tipped over and dumped before returning along a similar path in a continuous line around idler sprockets and at least one drive sprocket. The conveyor includes a pair of parallel endless chains that form a continuous path around the sprockets. The chains are connected by transverse extending rods spaced apart along the length of the chains. The rods support buckets intermediate the chains that hang on and pivot about the transverse rods. The buckets are molded lightweight plastic urethane elements or any other inexpensive, flexible, moldable material that is lightweight and durable. The buckets provide sufficient flexure to pass around the sprockets on the chains without damaging the individual buckets.

Each bucket generally includes a front wall and a rear wall with the rear wall extending upward further than the front wall. The molded bucket also includes a bottom portion and sides forming a container open at the top. The sides have an upper edge that extends at an oblique angle from the upper edge of the front wall upwards towards the rear wall. In one embodiment, the front edge also has a lip that arcs forward and downward projecting from the front wall and a section extending downward from the front portion of the lip. Aligned orifices extend through the front lip and wall while the rear wall also includes corresponding orifices along a top edge. The buckets are configured so that the top edge of the rear wall extends against the front wall of an adjacent bucket with the orifices through the front lip and front wall aligning with the orifices along the top edge of the rear wall of an adjacent bucket when assembled. Connector sets of rivets or screws provide for easy removal and replacement should a bucket become damaged. The lip, top edge of the rear wall of an adjacent bucket and front wall form an opening through which the transverse rods of the conveyor extend. The buckets are supported on and are able to pivot about the transverse rods as they move along the conveyor path.

In a second embodiment, the front wall of the bucket includes a flap that extends over the rear wall of an adjacent bucket and one of the transverse rods. In a third embodiment, an insert includes a hook that extends over the rear wall of an adjacent bucket and one of the transverse rods. The second and third embodiments of the bucket are supported and pivot on the conveyor in a similar manner to the buckets of the first embodiment.

Assembly of the system is easily accomplished as the buckets are simply molded and do not need further manipulation to form a container as is done with the prior buckets made of folded material. Moreover, the buckets are simply hung over the bars and aligned with an adjacent bucket and then bolted, riveted or otherwise connected together. Replacement and repair is easy as an individual bucket may be removed by releasing the connectors and inserting a new bucket in its place over the rod and connecting to the adjacent buckets in the conveyor system. The conveyor system provides for use on berry harvesters as well as other devices requiring a continuous bucket system and also saves labor and expense in manufacture and assembly of the systems. Moreover, repair or replacement is easier with individual buckets being easily and quickly removed than requiring removing a cup made of folded material and then folding and remaking a cup for insertion back into the conveyor.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout several views.

DETAILED DESCRIPTION OF THE PREFERRED EMBODIMENT

Figure 4:
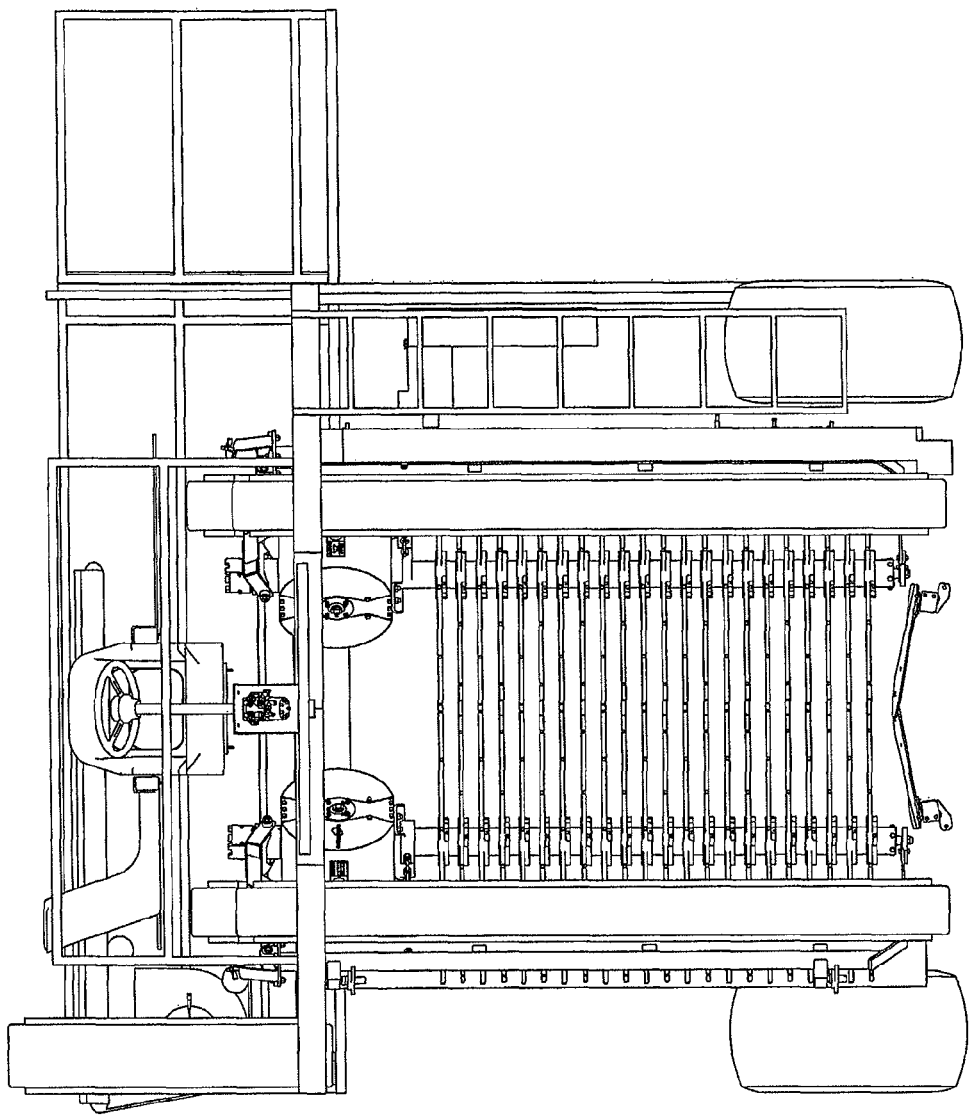
FIG. 4 is a front elevational view of a prior art harvester.
Figure 5:
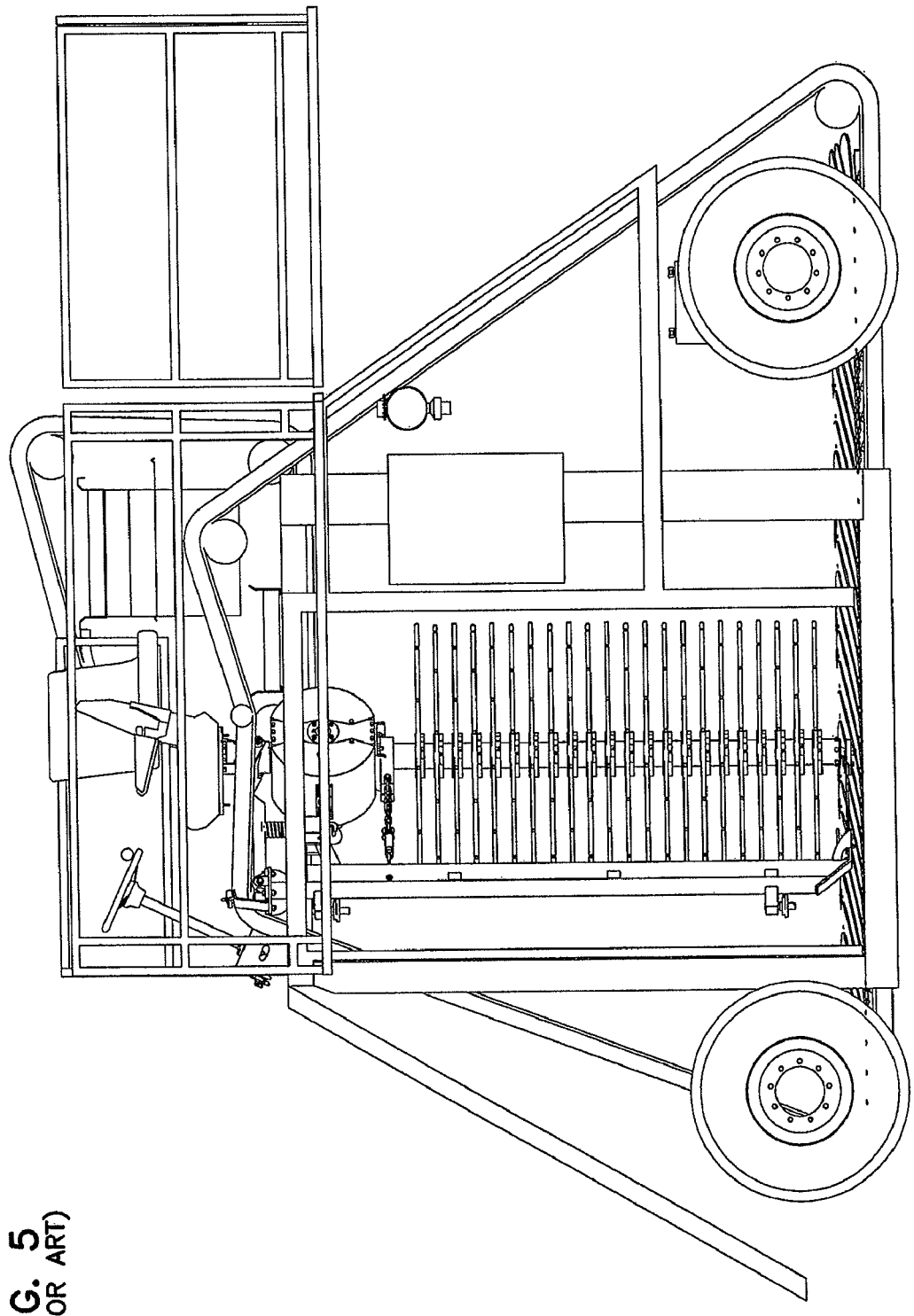
FIG. 5 is a side elevational view of the prior art harvester shown in FIG. 4.

Referring now to the drawings, and in particular to FIGS. 4 and 5, there is shown a conventional over the row berry harvester. Berry harvesters typically include beaters that engage the berry plants and remove the berries from the plant. Berries are then transported on conveyors or bucket lines that transport the harvested berries to other containers for further transport from the field.

As shown in FIG. 5, a typical harvester may include a lower bucket line that collects berries from the bottom and dumps it into an upper portion of the run and an upper bucket line receives the collected berries and transports them further. It may be noted that the conveyor systems and the harvesters may take on a variety of configurations but generally require a conveyor on each side of a central portion in an over the row harvester.

Figure 1:
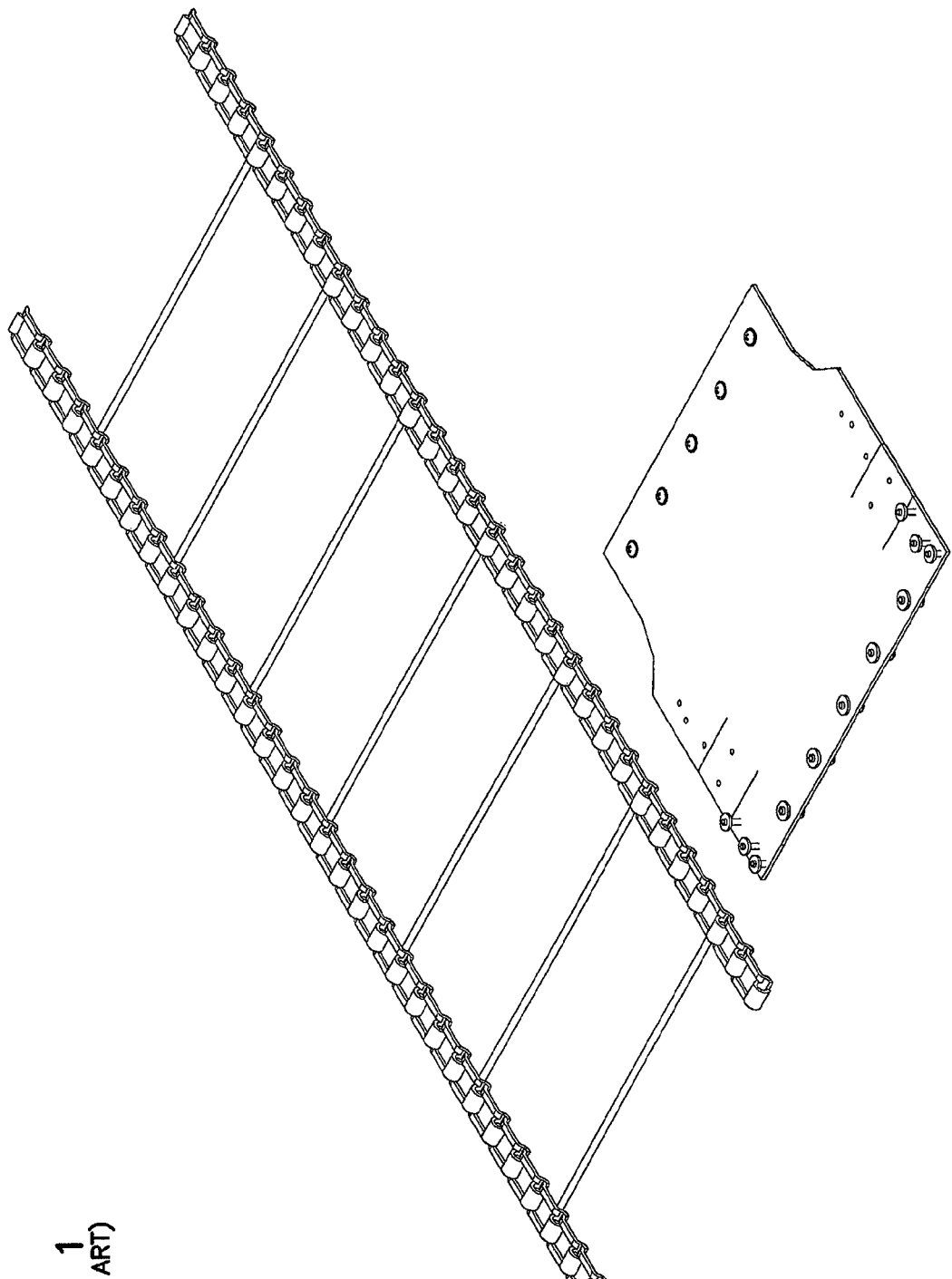
FIG. 1 is a perspective view of a prior art conveyor system.
Figure 2:
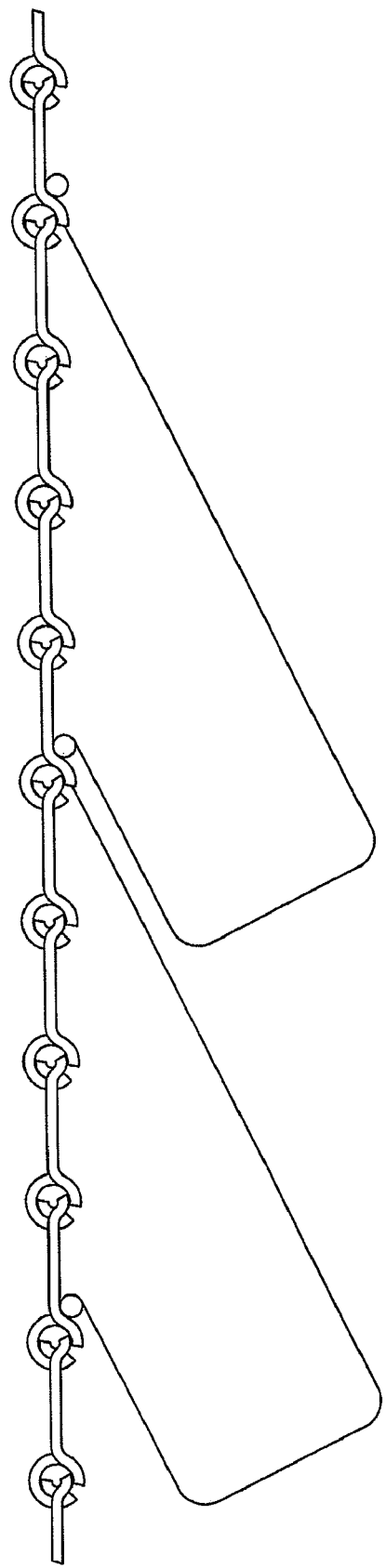
FIG. 2 is side elevational view of the prior art conveyor system shown in FIG. 1.

Referring to FIGS. 1 and 2, a typical conveyor configuration uses buckets made from PVC belts that are supported on rods extending between two parallel endless conveyor chains. The PVC belt is stamped and cut in a configuration that provides for folding over to form a bucket cup. The cups are then connected to the conveyor chains in an endless configuration as shown in FIG. 2. The belt is typically supplied as a strip of cups that is then folded and connected to form the series of cups extending along the length of the conveyor.

Figure 3:
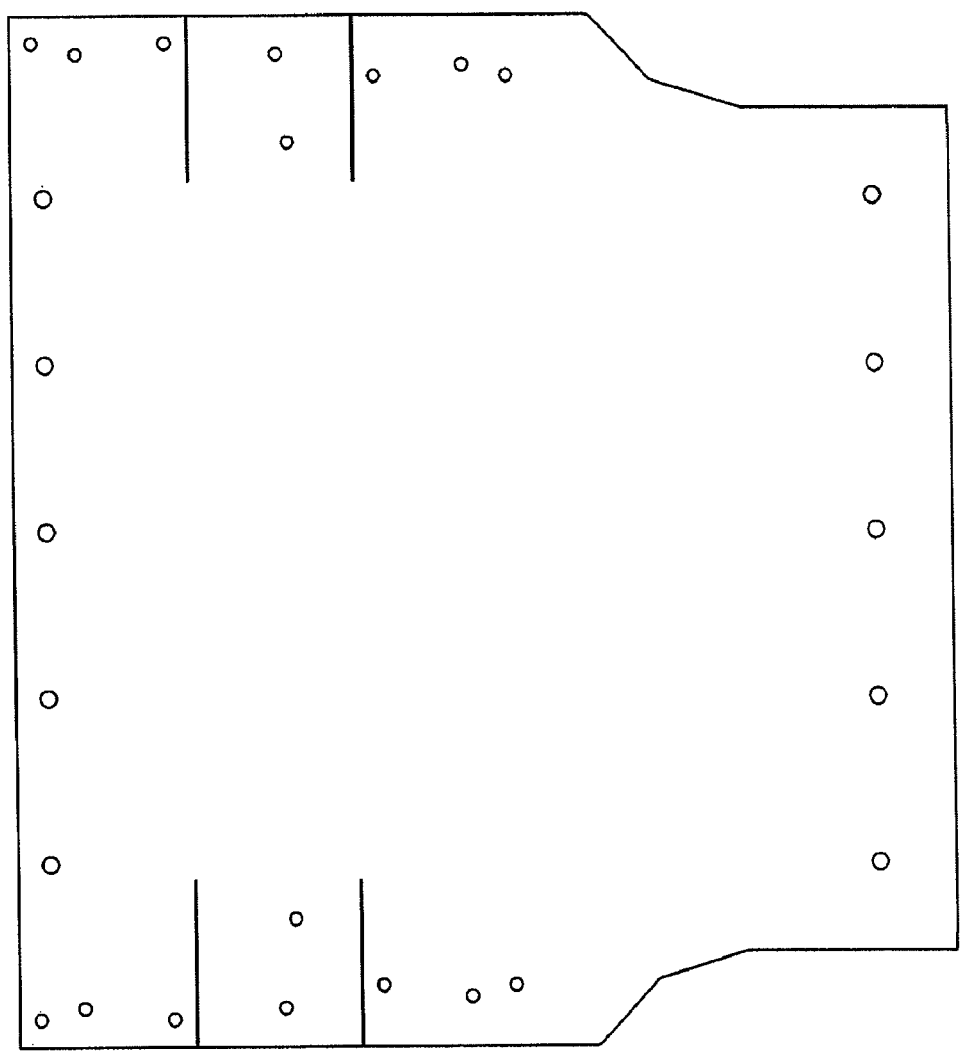
FIG. 3 is a front elevational view of a blank of a bucket to be folded for the prior art conveyor system shown in FIG. 1.

As shown in FIG. 3, an individual belt cup includes holes that must be folded over and aligned and then connected by rivets or other connectors to form the cups. However, the process of taking a flat sheet of material and forming individual cups is labor intensive and time consuming and increases the cost of such conveyors.

Figure 6:
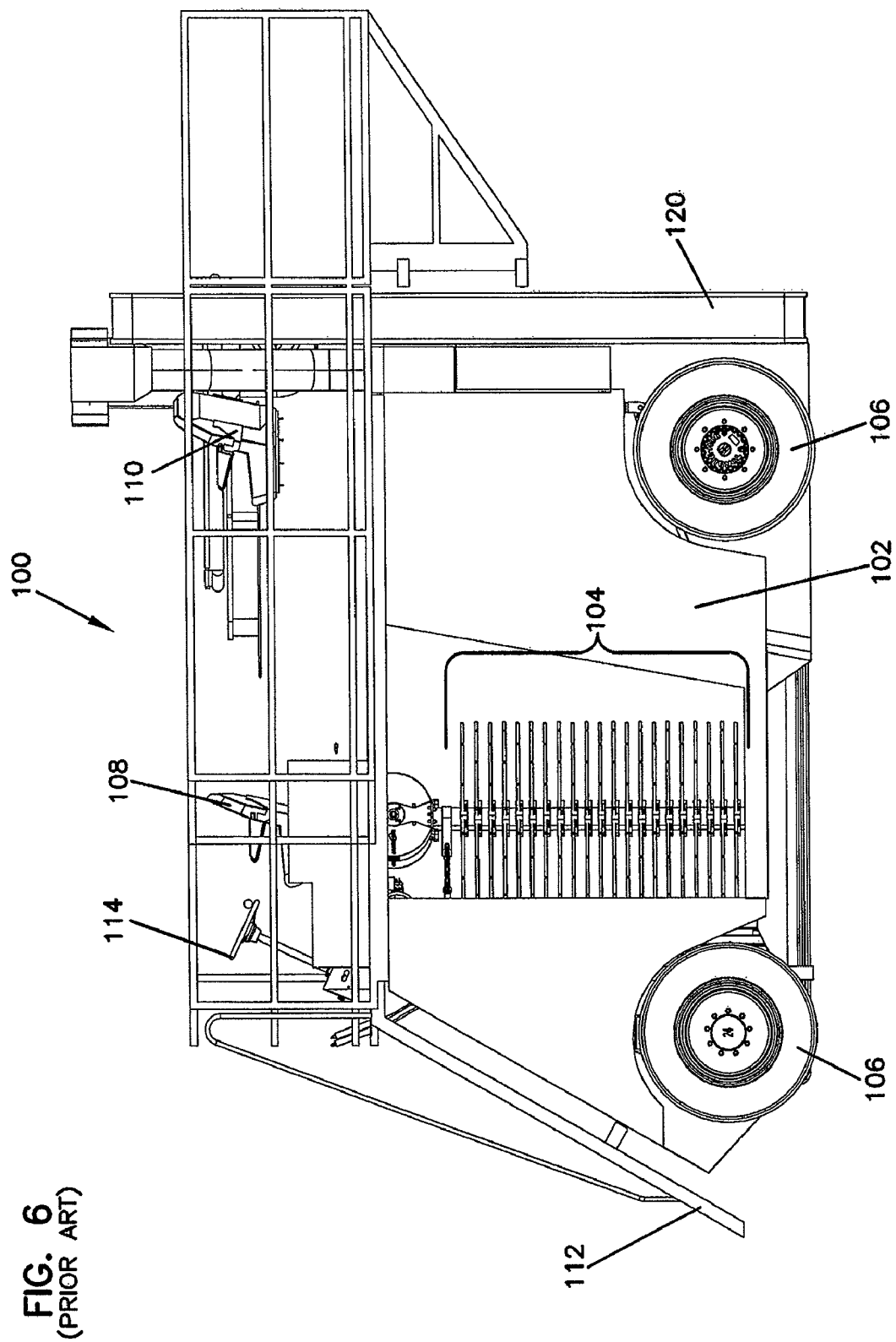
FIG. 6 is a side elevational view of a harvester having a conveyor system according to the principles of the present invention.
Figure 7:
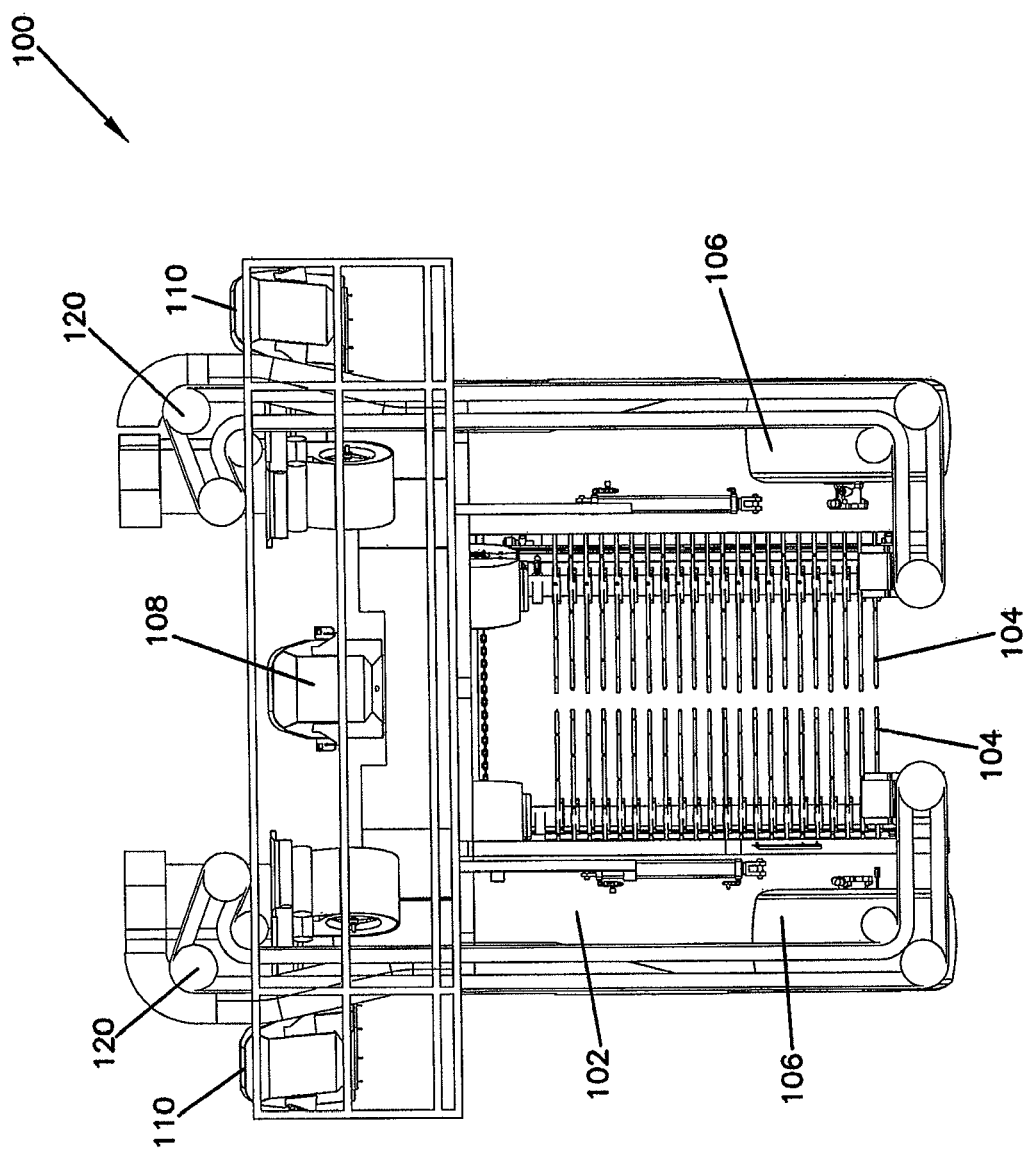
FIG. 7 is a rear elevational view of the harvester shown in FIG. 6.

Referring now to FIGS. 6 and 7, there is shown a harvester, generally designated 100. The harvester 100 shown is an over the row harvester and includes a chassis 102 mounted on wheels 106. The over the row harvester 100 includes beaters 104 extending inward from the side of the chassis 102 that engage either side of the berry plants as the harvester 100 passes along a row of berry plants. A ladder 112 provides access to a driver seat 108 and a steering wheel 114 as well as other controls. A further operator seat 110 may be placed at the rear of the harvester 100 to provide for inspection and cleaning and to ensure that the harvester and transport systems are operating correctly. Although the harvester shown is a four wheel harvester, it can be appreciated that the present invention may be adaptable to other configurations such as three wheel harvesters and harvesters having different conveyor and beater configurations.

Figure 8:
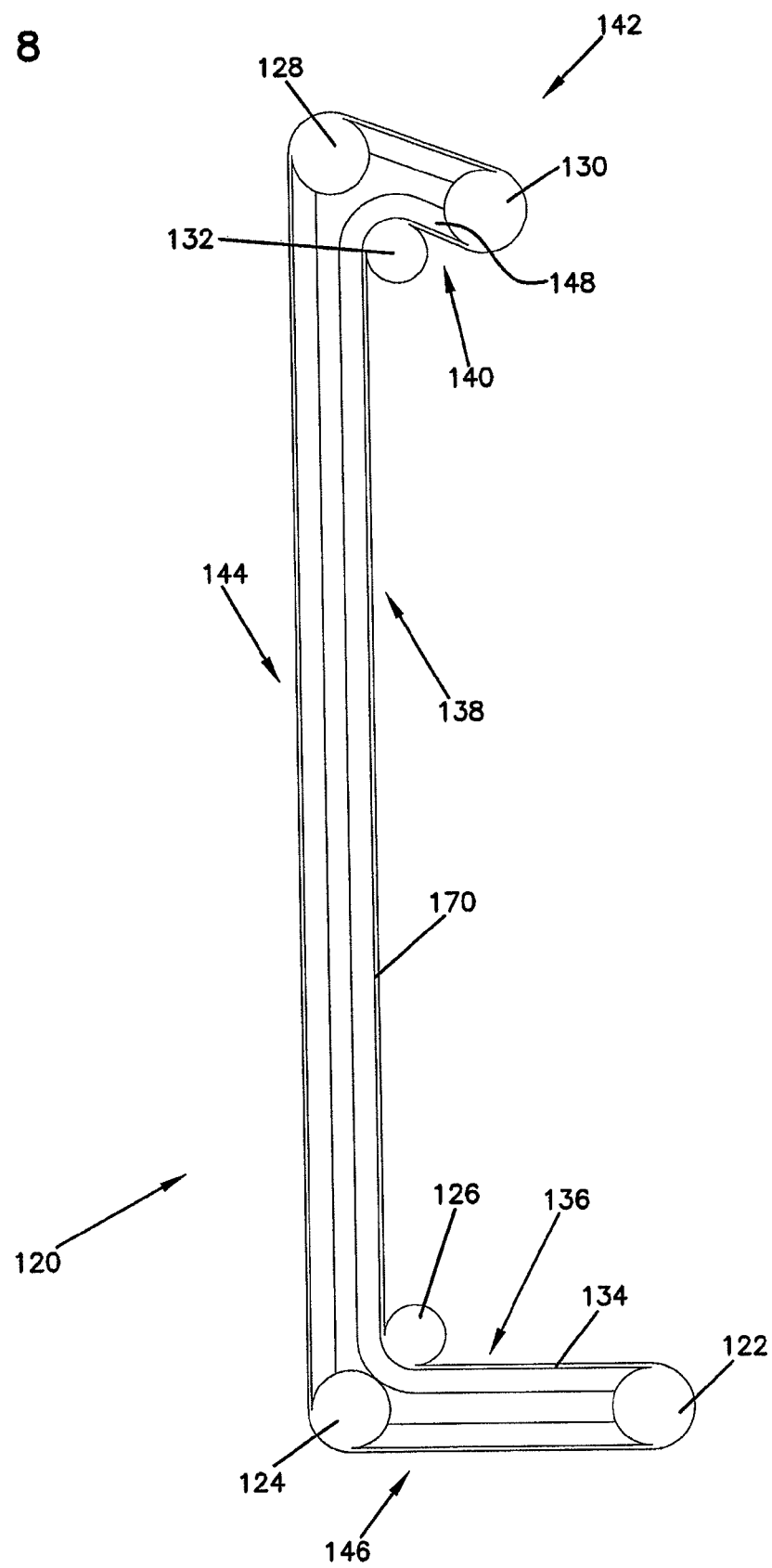
FIG. 8 is a side view of a conveyor path for the harvester shown in FIG. 6.
Figure 9:
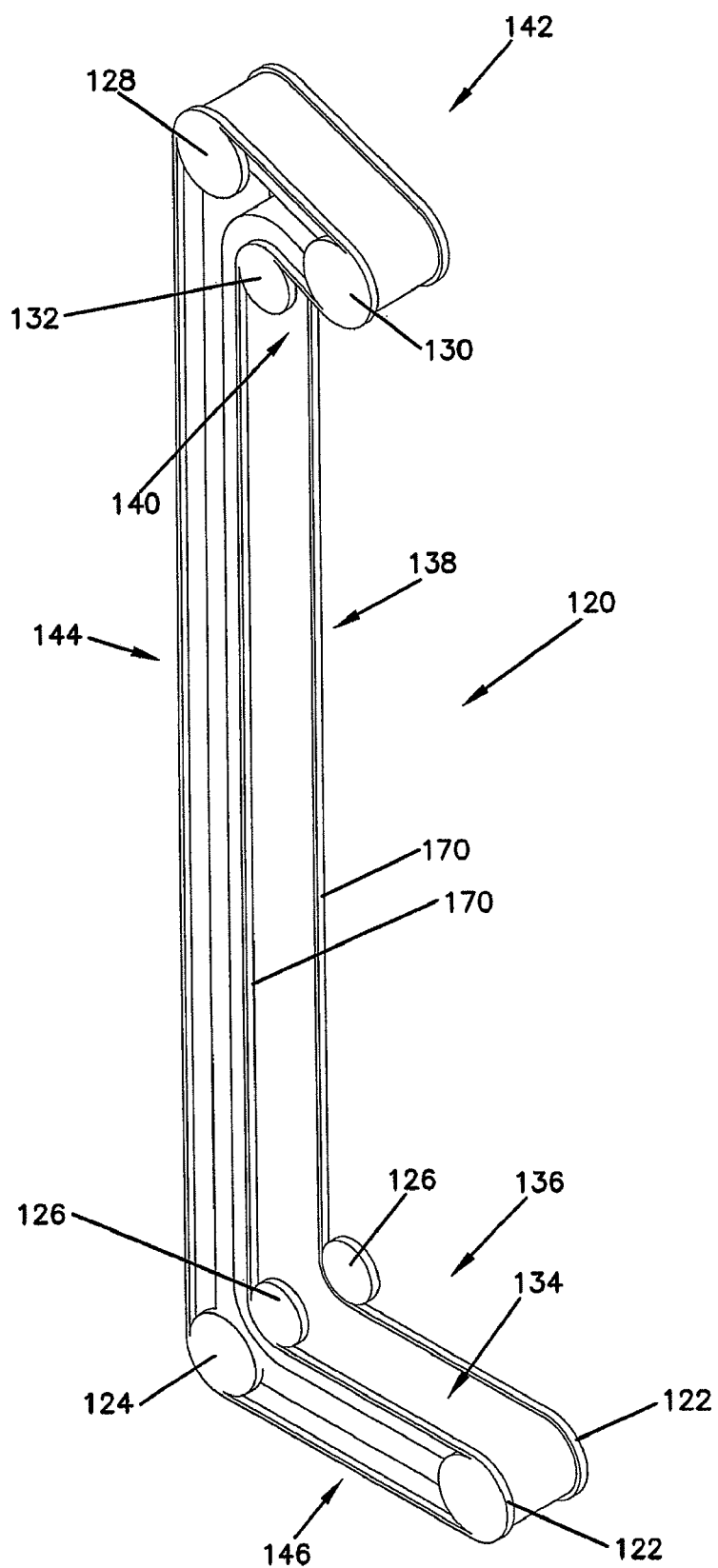
FIG. 9 is a perspective view of the conveyor path shown in FIG. 8.
Figure 10:
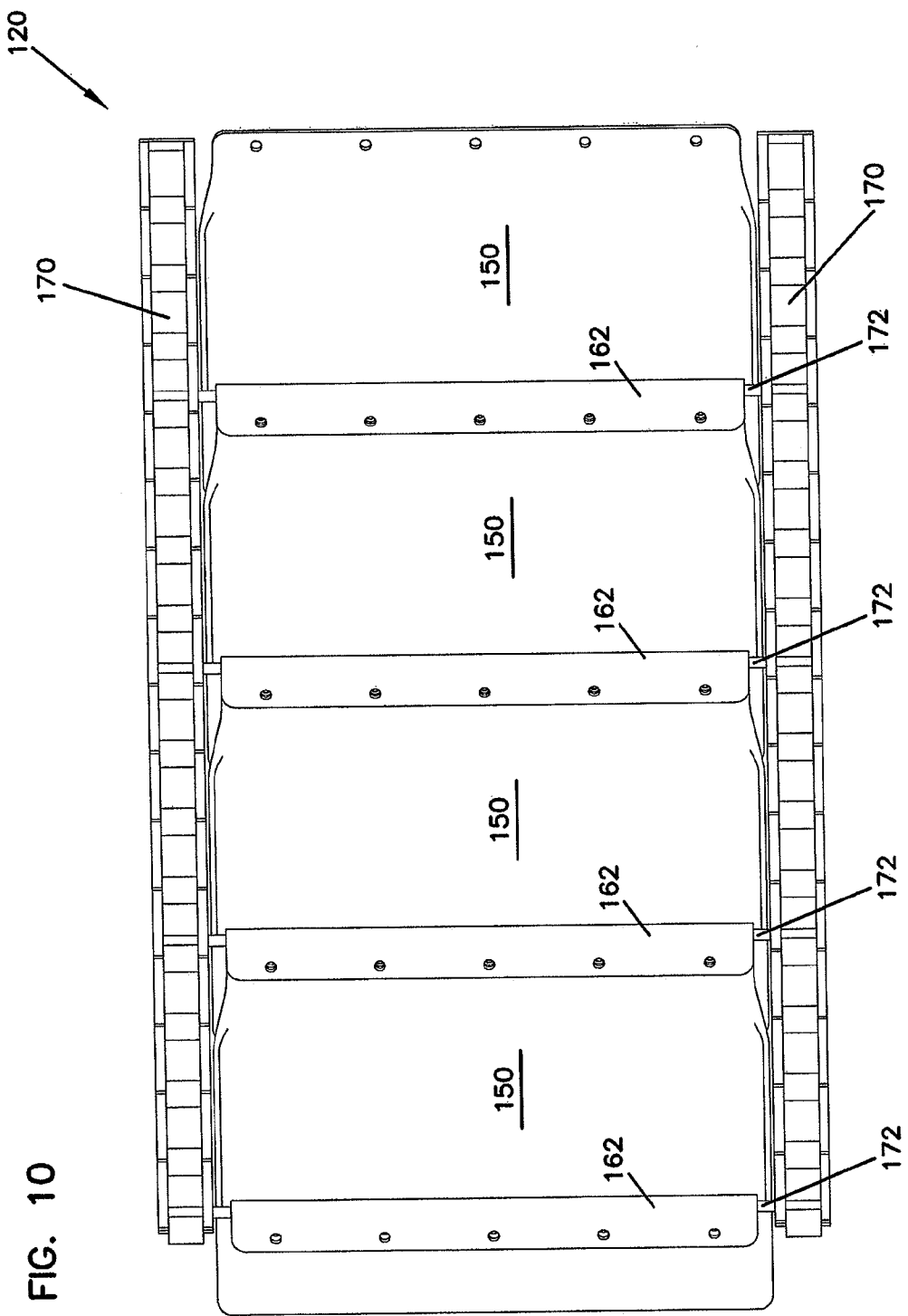
FIG. 10 is a top plan view of a portion of the conveyor for the harvester shown in FIG. 6.

The over the row harvester 100 includes two sets of conveyors 120 shown in FIGS. 6 and 7. The path of the conveyors shown in FIGS. 8 and 9 includes an endless chain and bucket assembly that extends around idler sprockets 122, 124, 126, 128 and 130 as well as a drive sprocket 132. Buckets pass along a lower fill run 136 and then vertically upward along a lift run 138 to an upper tip run 140. After tipping and emptying the berries, the buckets pass along an upper return run 142, pass downward along a vertical return run 144, and a lower return run 146. The buckets are typically filled along the lower fill run at approximately position 134 and are emptied at a dump point 148 on the upper tip run 140. The conveyor 120 is generally configured with two sets of endless parallel chains 170 passing along the idler sprockets 122, 124, 126, 128 and 130.

Referring now to FIGS. 10-13, in a first embodiment, the conveyor 120 includes spaced apart chains 170 with rods 172 extending transversely to the direction of the conveyor run and attaching to each spaced apart chains 170. The chains support buckets 150 that are connected to one another to form a continuous bucket run. The buckets 150 are configured to mount on the rods 172 as shown most clearly in FIG. 13 and to connect to one another in a continuous bucket assembly.

Figure 14:
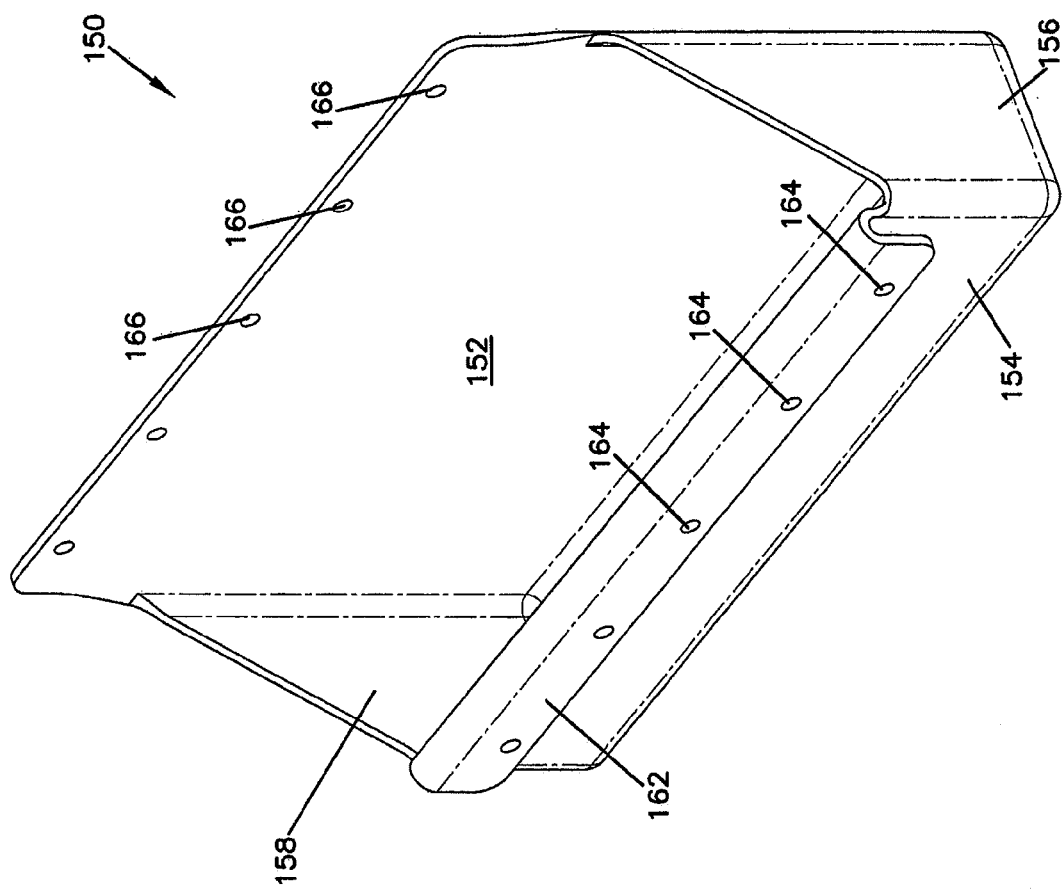
FIG. 14 is a perspective view of a first embodiment of a bucket for the conveyor system shown in FIG. 10.
Figure 15:
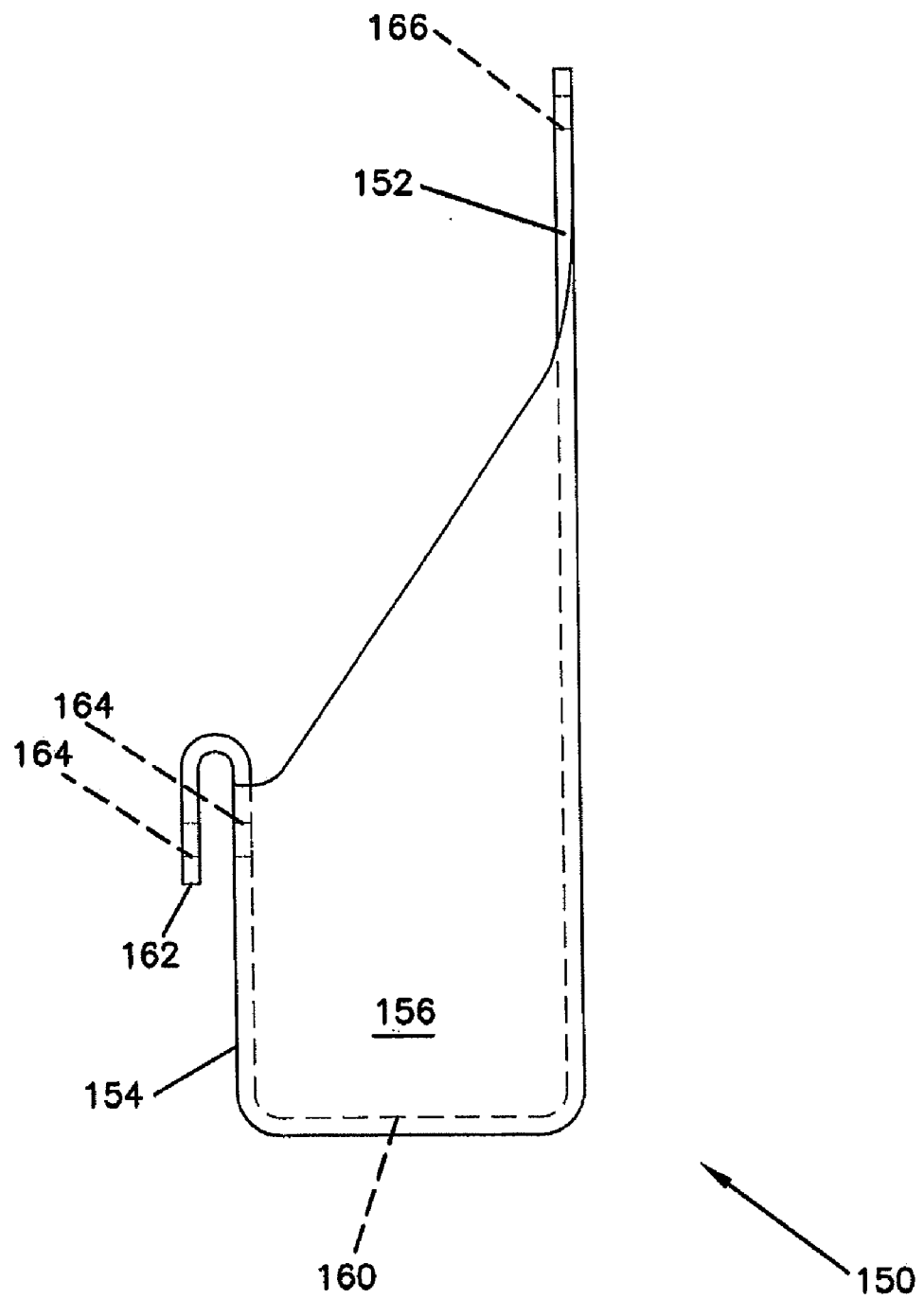
FIG. 15 is a side elevational view of the bucket shown in FIG. 14.
Figure 16:
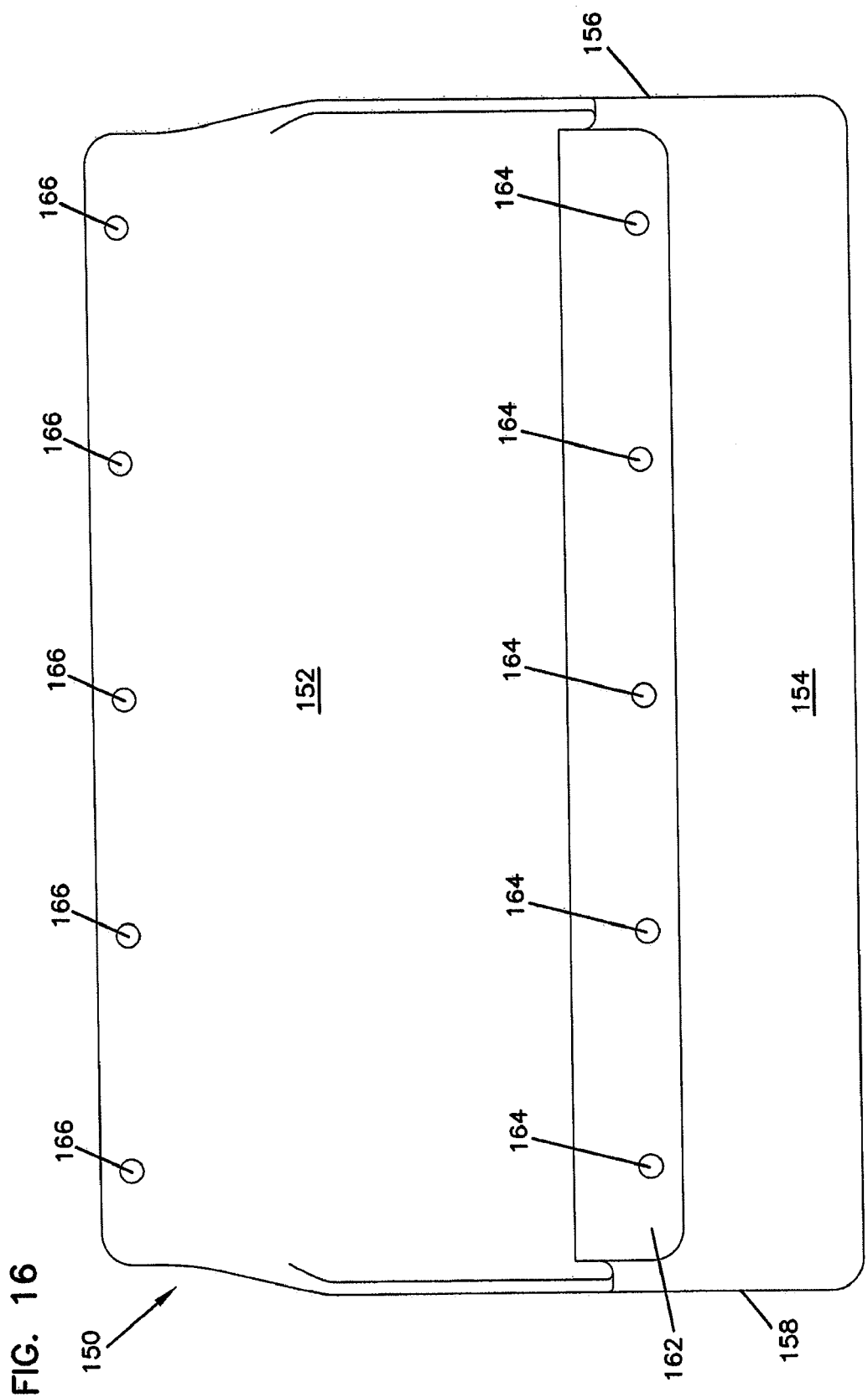
FIG. 16 is a front plan view of the bucket shown in FIG. 14.

Referring now to FIGS. 14-16, the buckets 150 are molded buckets of a lightweight plastic material that provide some flexibility. It has been found that a urethane material may be acceptable but other inexpensive, lightweight, durable, moldable materials would also be suitable. Each bucket 150 includes a front wall 154, a rear wall 152, a bottom wall 160 and side walls 156 and 158. The rear wall 152 is higher than the front wall 154 and the side walls 156 and 158 angle upwardly along the top edge to transition from the front to the rear wall. A portion of the rear wall 152 extends beyond the side walls 156 and 158 and includes connecting holes 166. In a first embodiment, the front wall 154 includes a lip 162 that arcs upward forward and then has a portion that extends downward for a small distance parallel to the front wall 154. The front portion of the lip 162 includes orifices 164 that also extend through the front wall 154 as shown in FIG. 15. The orifices 164 and 166 are aligned so that adjacent buckets 150 may be mounted to one another with the top of the rear wall 152 inserting into the space formed intermediate the front portion of the lip 162 and the front wall 154. The bolts, rivets or other conventional connectors may be inserted through the holes 164 and 166 to retain the rear wall 152 against the front wall 154 of adjacent buckets 150. The lip 162, rear wall 152 and front wall 154 form an opening when connected that receives the transverse extending rods 172 of the conveyor 120, as shown most clearly in FIGS. 12 and 13. The mounting configuration allows the buckets 150 to pivot about the rods 172. This is required as the buckets 150 pass around the sprockets 122, 124, 126, 128 and 130 of the conveyor system 120. This is also required as the buckets 150 tip and realign while passing along the conveyor path shown in FIGS. 8 and 9.

Figure 17:
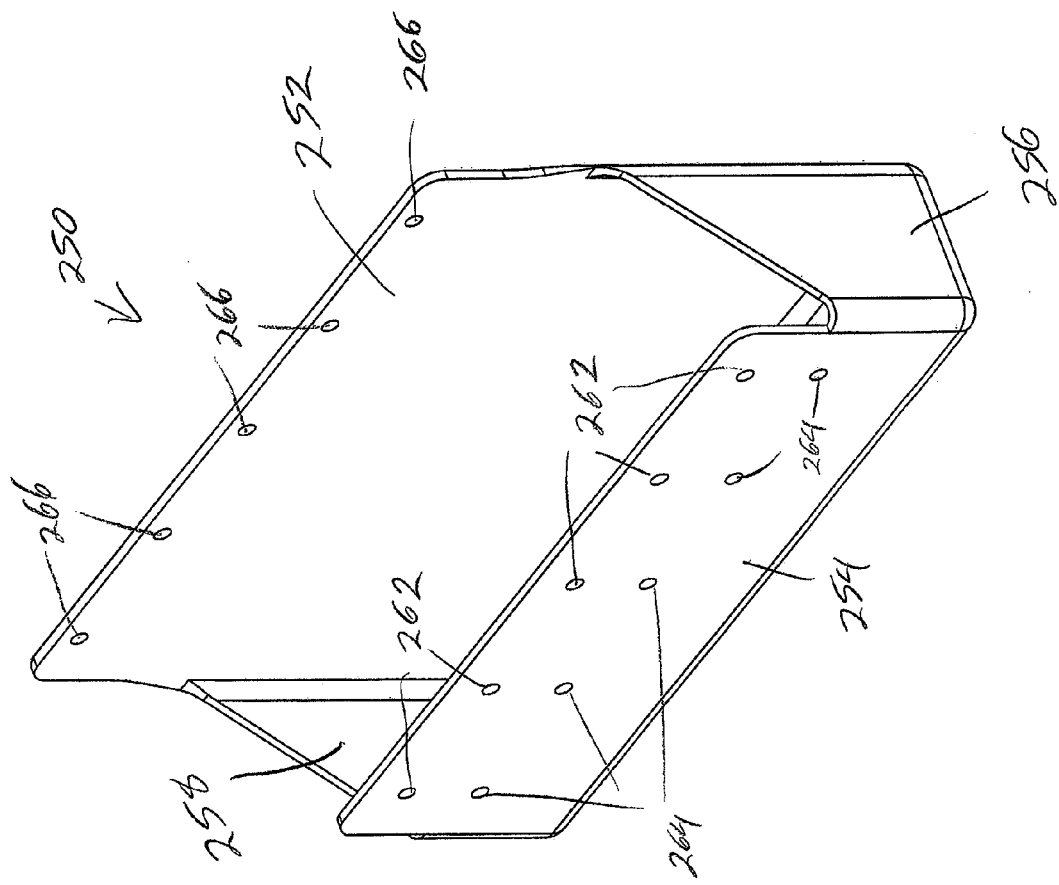
FIG. 17 is a perspective view of a second embodiment of a bucket for the conveyor system shown in FIG. 10.
Figure 18:
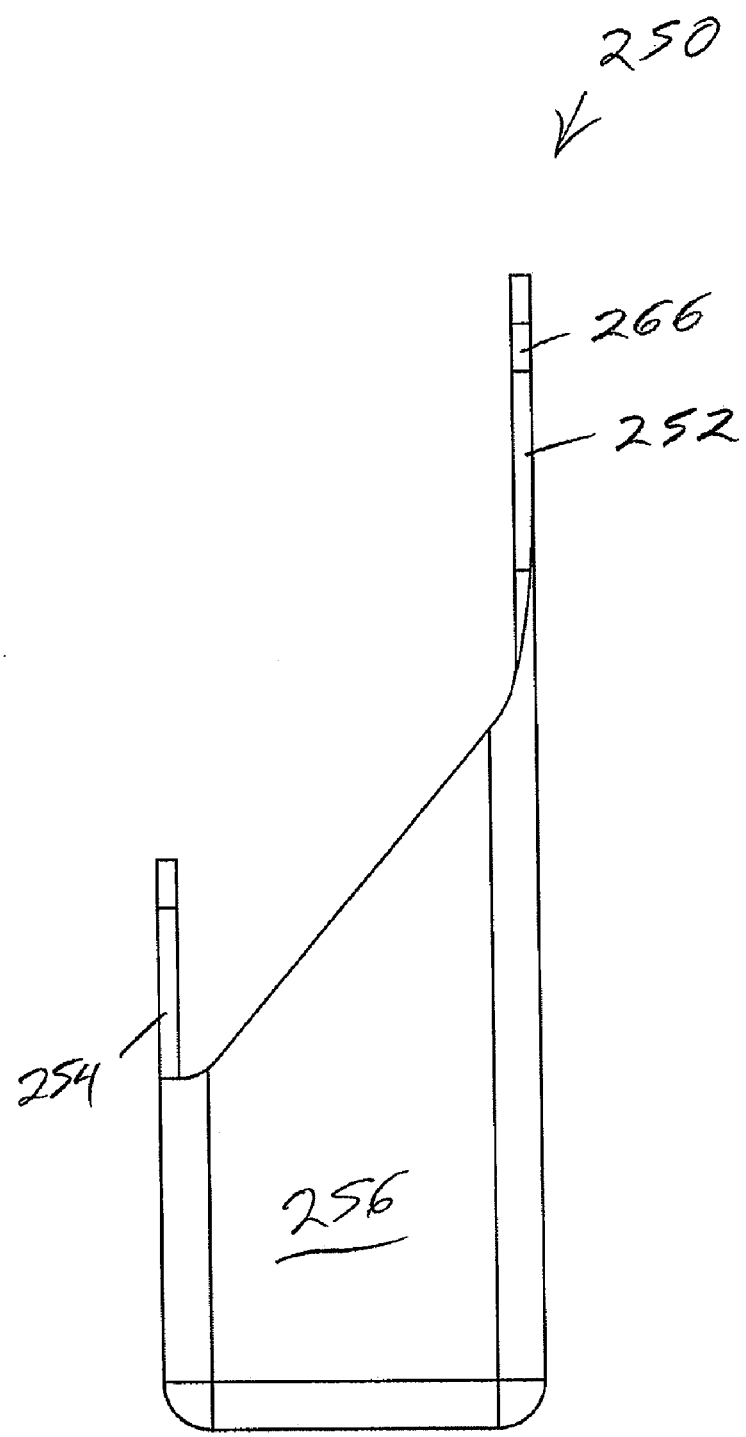
FIG. 18 is a side elevational view of the bucket shown in FIG. 17.
Figure 19:
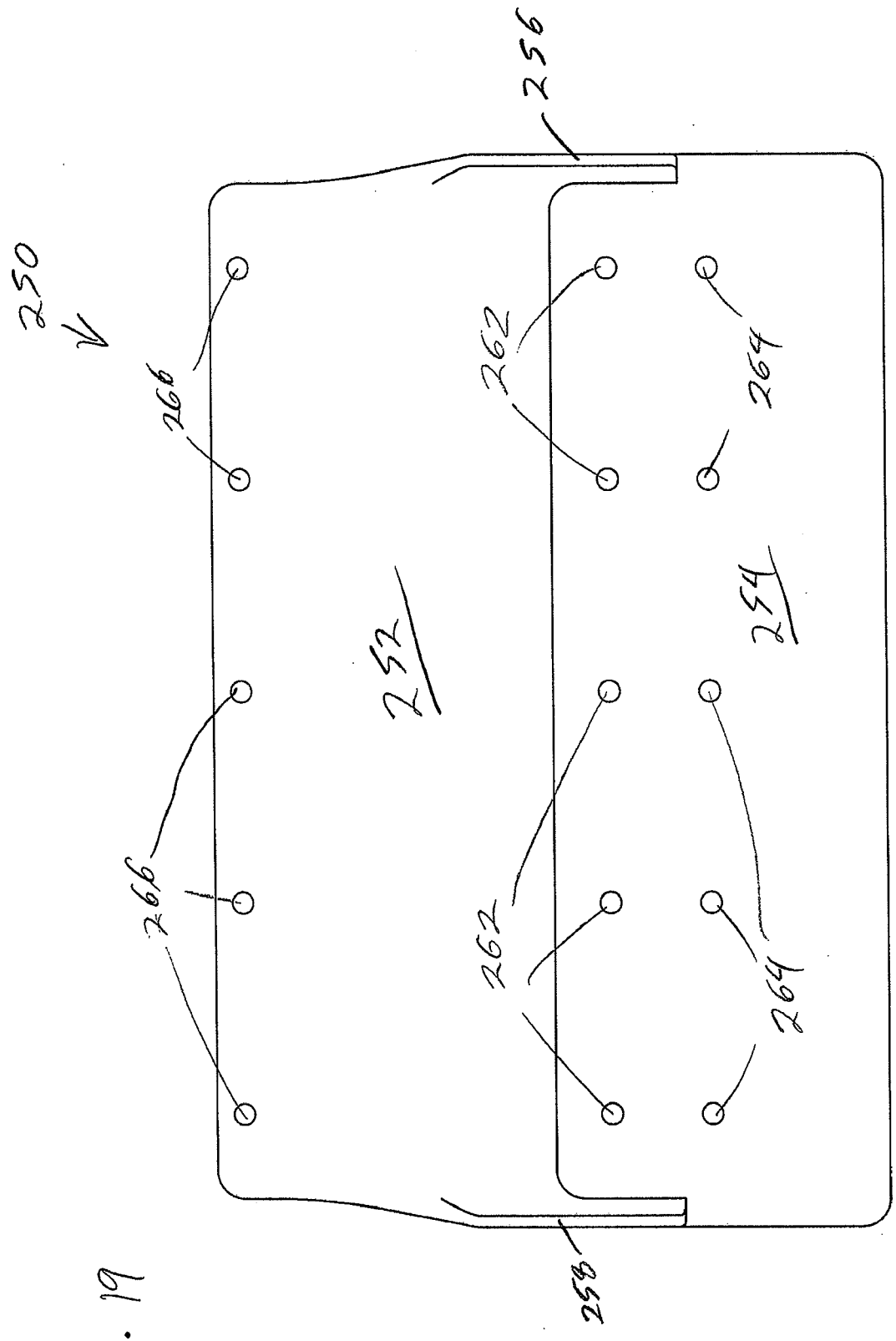
FIG. 19 is a front plan view of the bucket shown in FIG. 17.

Referring now to FIGS. 17-19, a second embodiment of buckets 250 may also be used with the conveyor system 120. Each bucket 250 includes a front wall 254, a rear wall 252, a bottom wall 260 and side walls 256 and 258. The rear wall 252 is higher than the front wall 254 and the side walls 256 and 258 angle upwardly along the top edge to transition from the front to the rear wall. A portion of the rear wall 252 extends beyond the side walls 256 and 258 and includes connecting holes 266. Unlike the bucket 150, the front wall 254 is straight rather than having an arcing lip. An upper portion of the front wall 254 is sufficiently flexible that it may be bent over in a manner similar to the molded lip 162 of bucket 150. Orifices 262 and 264 extend through the front wall 254. When assembled, the upper portion of the front wall 254 is folded over the upper edge of the rear wall 256 of an adjacent bucket 250 so that the orifices 262, 264 and 266 are aligned. Adjacent buckets 250 may be mounted to one another with the top of the rear wall 252 inserting into the space formed intermediate the folded portion of the front wall and the straight portion of the front wall 254. The bolts, rivets or other conventional connectors may be inserted through the holes 262, 264 and 266 to retain the rear wall 252 against the front wall 254 of adjacent buckets 250. The rear wall 252 and the front wall 254 form a channel when connected that receives the transverse extending rods 172 of the conveyor 120, as shown most clearly in FIGS. 12 and 13. The mounting configuration allows the buckets 250 to pivot about the rods 172 in a manner similar to the buckets 150.

Figure 20:
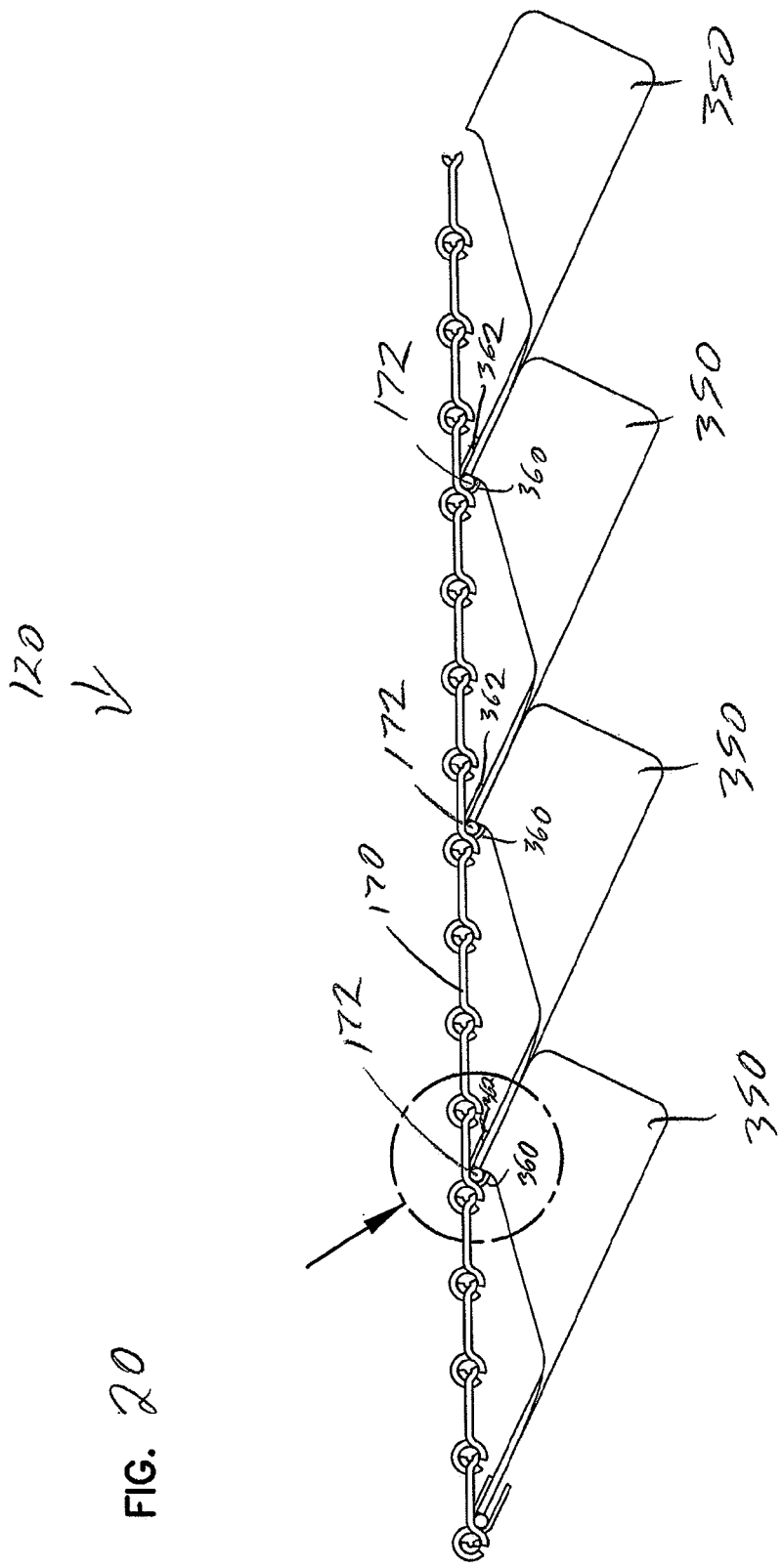
FIG. 20 is a side elevational view of a second embodiment of a conveyor for the harvester shown in FIG. 6.
Figure 21:
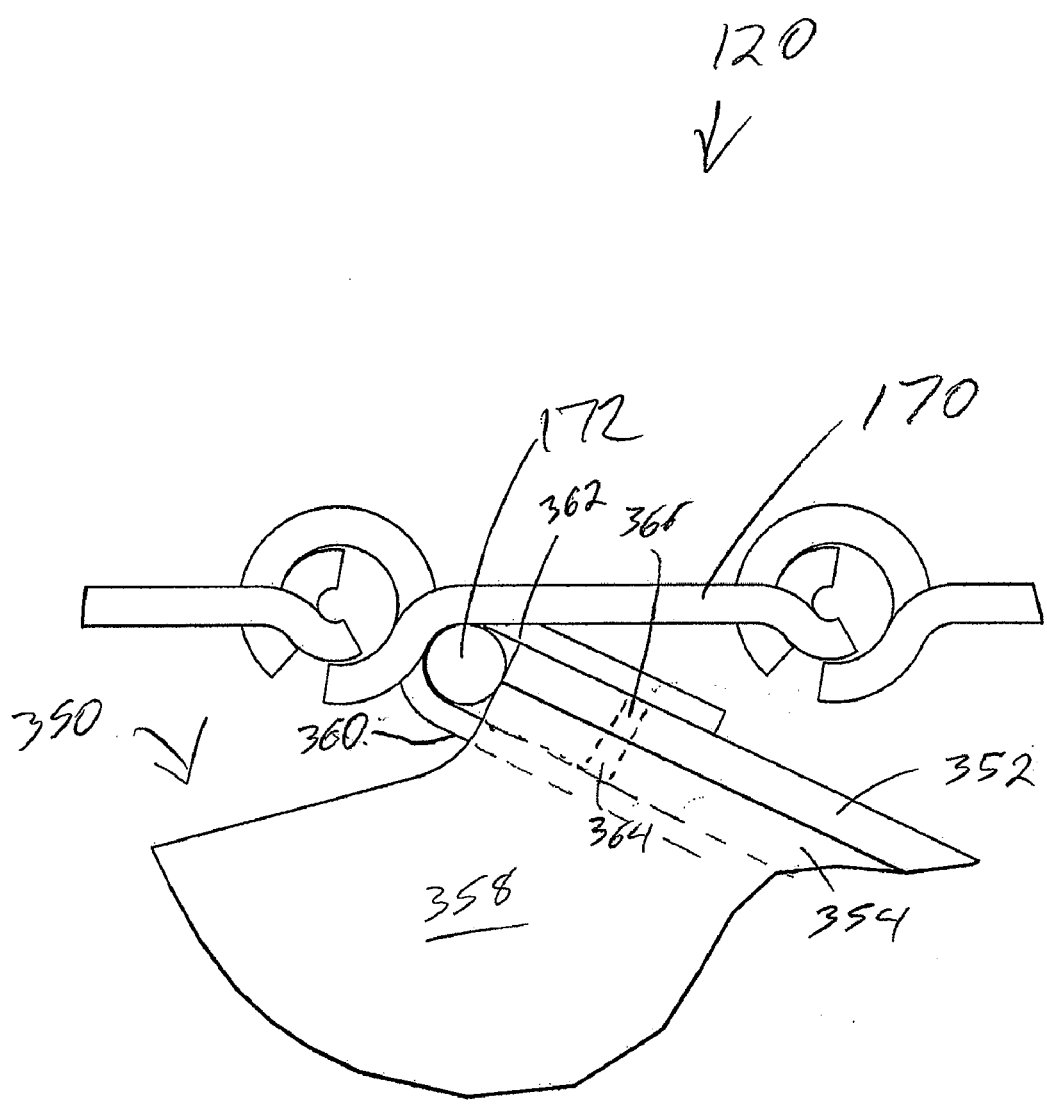
FIG. 21 is a detail view of the chain and bucket lip for the conveyor system shown in FIG. 20.
Figure 22:
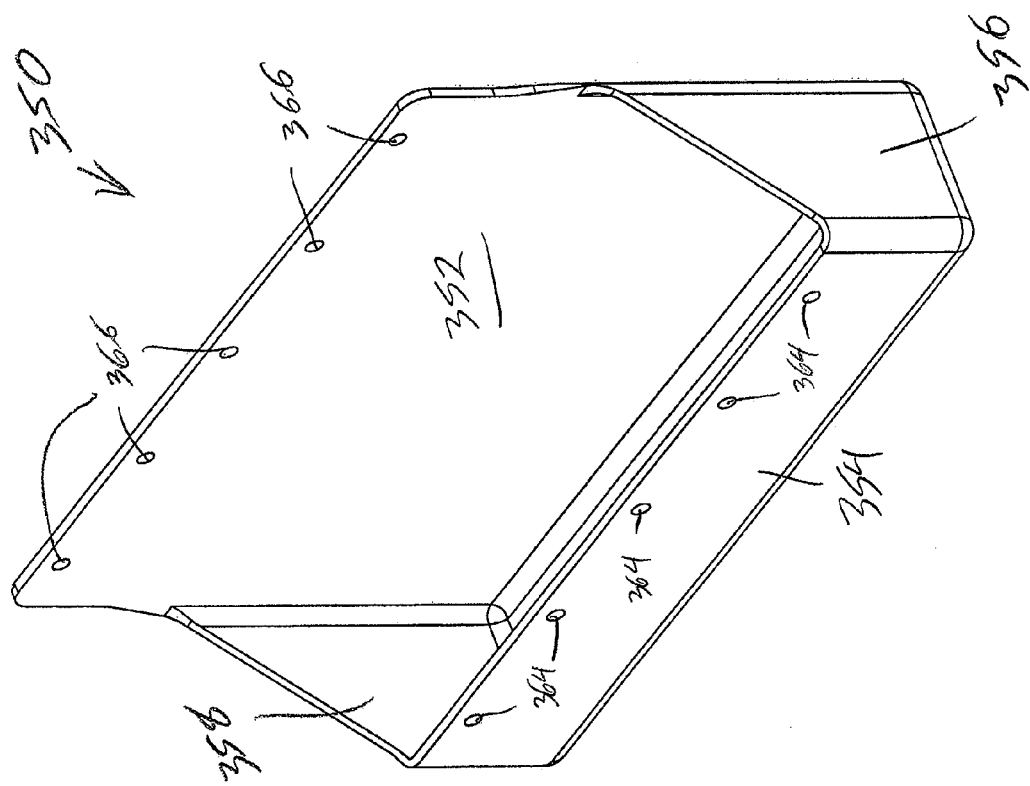
FIG. 22 is a perspective view of a second embodiment of a bucket for the conveyor system shown in FIG. 20.
Figure 23:
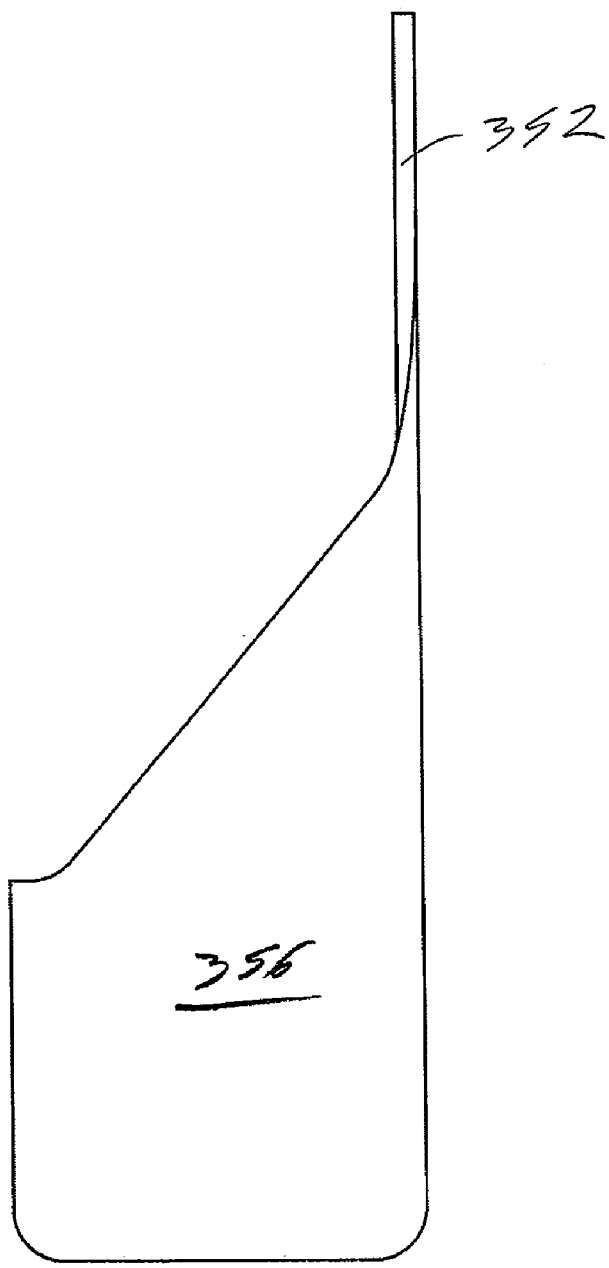
FIG. 23 is a side elevational view of the bucket shown in FIG. 22.
Figure 24:
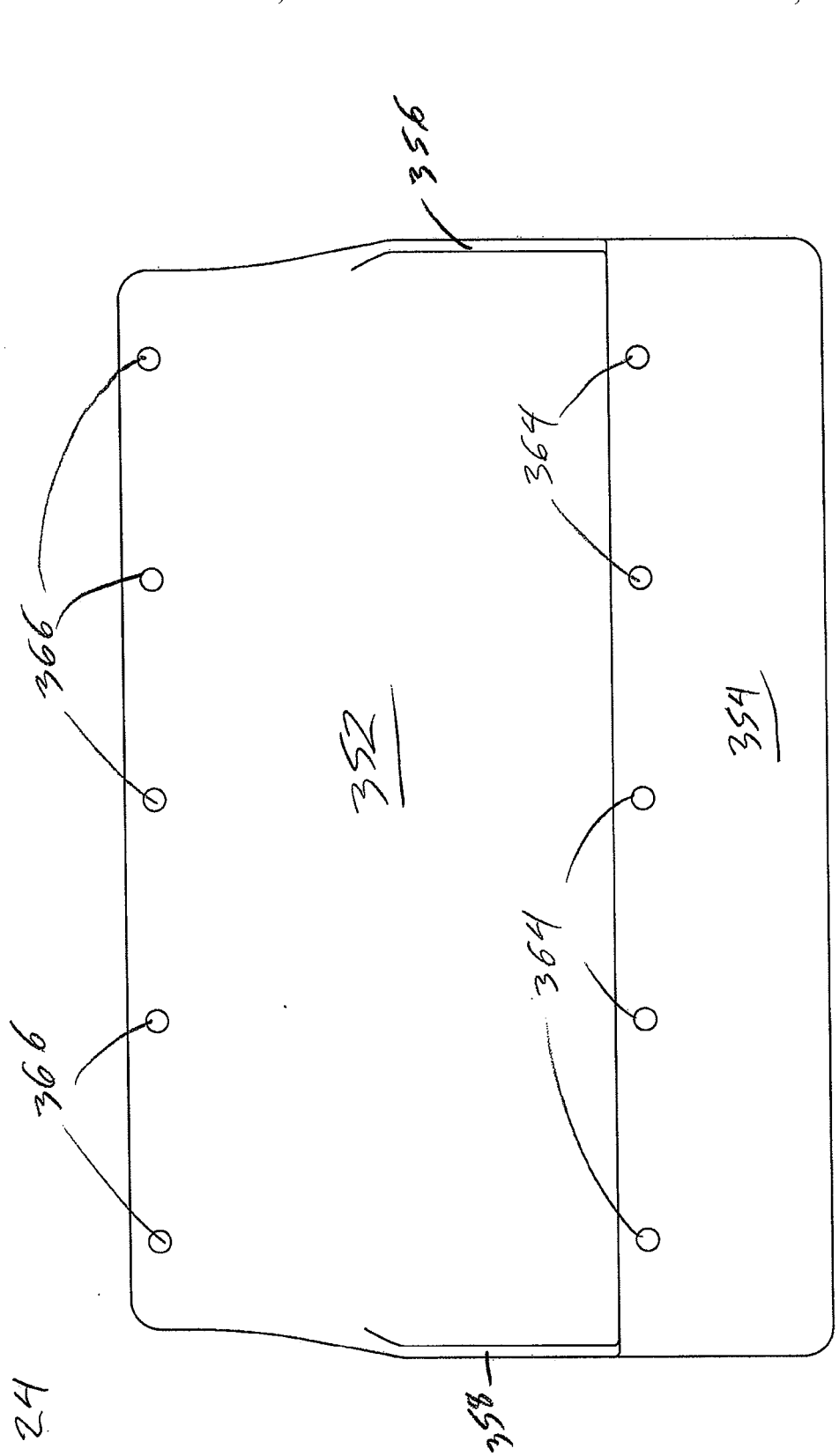
FIG. 24 is a front plan view of the bucket shown in FIG. 22.

Referring now to FIGS. 20-24, a third embodiment of buckets 350 may also be used with the conveyor system 120. Each bucket 350 includes a low front wall 354, a rear wall 352, a bottom wall 360 and side walls 356 and 358. The rear wall 352 is higher than the front wall 354 and the side walls 356 and 358 angle upwardly along the top edge to transition from the front to the rear wall. A portion of the rear wall 352 extends beyond the side walls 356 and 358 and includes connecting holes 366. Unlike the bucket 150, the front wall 254 is straight rather than having an arcing lip. However, an insert 360 mounts to the front wall 354 and includes a hook or lip portion 362. The insert 360 may be made of a rigid material that resists wear and corrosion, such as stainless steel. Orifices 364 extend through the front wall 354 and mount the insert 360 and to the rear wall 356 of an adjacent bucket 350, as shown in FIGS. 20-21. When assembled, the upper lip 362 of the insert 360 extends over the upper edge of the rear wall 352 of an adjacent bucket 350 so that the orifices 364 and 366 are aligned. When the buckets 350 are connected, the rear wall 352 and the lip 362 of the insert 360 define a channel that receives the transverse extending rods 172 of the conveyor 120, as shown most clearly in FIG. 21. The mounting configuration allows the buckets 350 to pivot about the rods 172 in a manner similar to the buckets 150.

Figure 11:
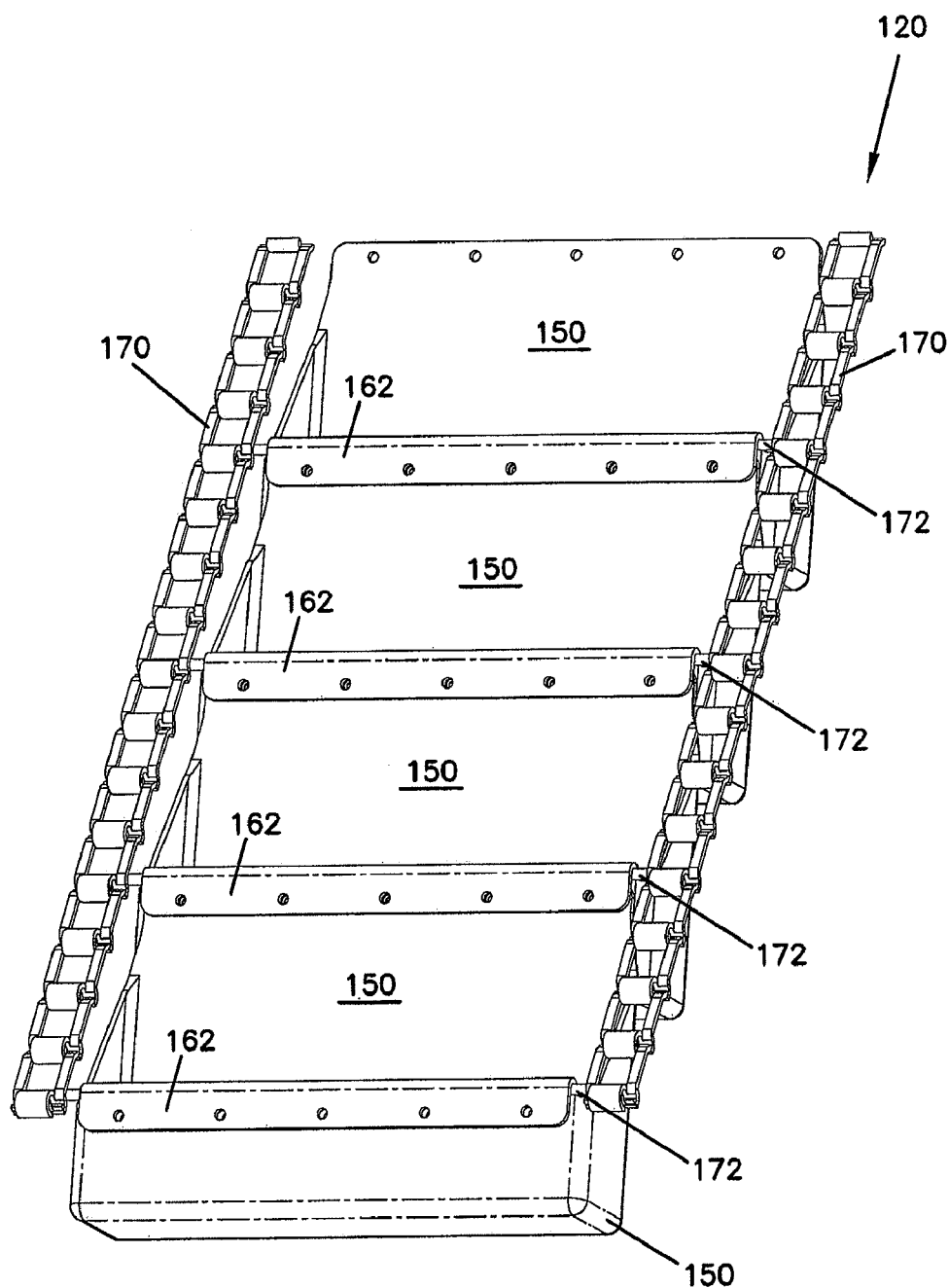
FIG. 11 is a perspective view of the portion of the conveyor shown in FIG. 10.
Figure 12:
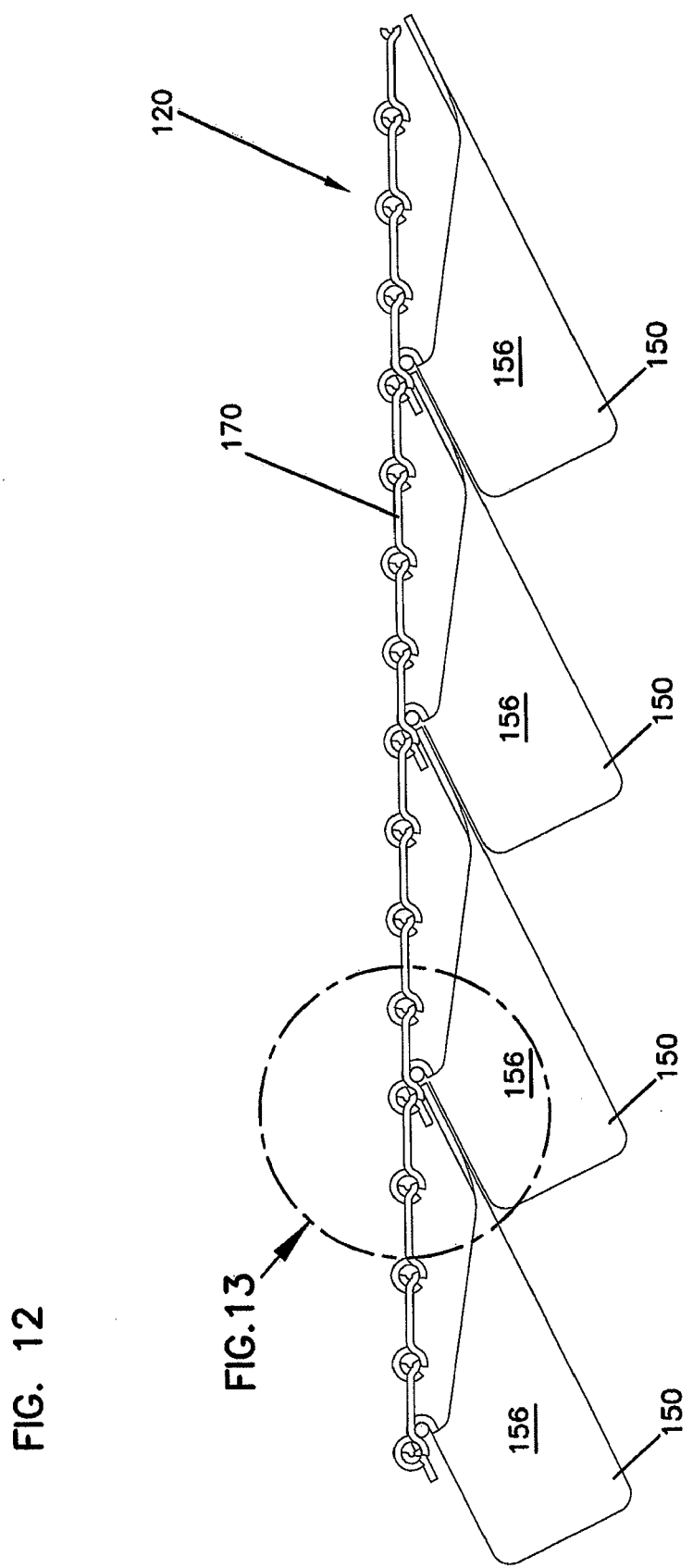
FIG. 12 is a side elevational view of the portion of the conveyor shown in FIG. 10.
Figure 13:
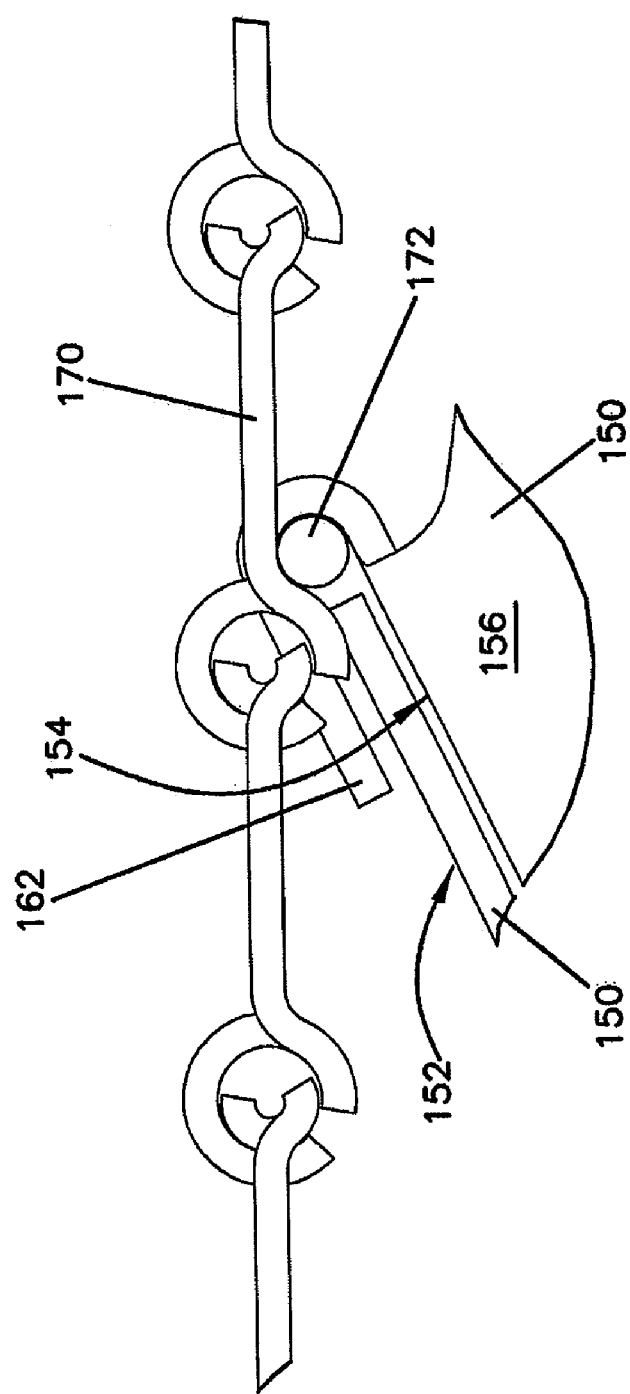
FIG. 13 is a detail view of the chain and bucket lip for the conveyor system shown in FIG. 10.

The running configuration also provides for connection between the buckets 150, 250 or 350. However, as the buckets are made of a flexible molded material, further pivoting between the buckets is not required. The bucket design also provides for a continuous open upper receiving face that catches the berries as they fall in at the lower run 136 on the conveyor. As shown in FIGS. 11 and 12, this provides for a substantially open face when viewed from above to receive the loosened berries. It can also be appreciated that the obliquely angled upper edge of the sidewalls 156 and 158 provide for maintaining a sufficiently high upper side edge for the receiving portion formed by the buckets 150 when transporting the berries.

It can also be appreciated that the configuration provides for easily replacing an individual bucket 150, 250 or 350 by simply loosening the bolts or loosening the connectors and inserting a new bucket 150, 250 or 350 into the system. This provides for quick and easy repair and replacement with low cost molded buckets.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A harvester comprising:
   a harvesting assembly;
   a conveyor assembly for collecting harvested produce, the conveyor assembly comprising:
   a continuous first chain;
   a continuous second chain extending parallel to the first chain;
   a plurality of parallel spaced apart rods extending between the chains; and
   a plurality of buckets, each bucket comprising:
   a first wall,
   a second wall spaced apart from the first wall and extending higher than the first wall,
   opposed sides connecting the first wall and the second wall, a bottom portion connecting the first wall, the second wall and the opposed sides, the sides having upper edges, the upper edges extending at an oblique angle to the first wall and the second wall, and a lip formed in the first wall and projecting outward and downward from the first wall mounting on one of the rods and extending over an upper edge of the second wall of an adjacent bucket;

the conveyor assembly including a horizontally extending portion, wherein the molded buckets passing along the horizontally extending portion are supported on the rods so that the first and second walls are at an oblique angle to horizontal.

* * * * *